United States Patent
Leithinger et al.

(10) Patent No.: US 9,298,264 B2
(45) Date of Patent: Mar. 29, 2016

(54) METHODS AND APPARATUS FOR ACTUATED 3D SURFACE WITH GESTURAL INTERACTIVITY

(75) Inventors: Daniel Leithinger, Cambridge, MA (US); David Lakatos, Cambridge, MA (US); Anthony DeVincenzi, Boston, MA (US); Matthew Blackshaw, Cambridge, MA (US); Hiroshi Ishii, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 770 days.

(21) Appl. No.: 13/473,396

(22) Filed: May 16, 2012

(65) Prior Publication Data

US 2012/0293411 A1 Nov. 22, 2012

Related U.S. Application Data

(60) Provisional application No. 61/486,579, filed on May 16, 2011.

(51) Int. Cl.
| | |
|---|---|
| *G06F 3/01* | (2006.01) |
| *G06F 3/033* | (2013.01) |
| *G06F 3/041* | (2006.01) |
| *G06F 3/0488* | (2013.01) |

(52) U.S. Cl.
CPC ............... *G06F 3/017* (2013.01); *G06F 3/033* (2013.01); *G06F 3/041* (2013.01); *G06F 3/04883* (2013.01); *G06F 3/04886* (2013.01); *G06F 2203/04101* (2013.01)

(58) Field of Classification Search
None
See application file for complete search history.

(56) References Cited

U.S. PATENT DOCUMENTS

| | | | | |
|---|---|---|---|---|
| 6,903,871 B2 * | 6/2005 | Page | ............................ | 359/443 |
| 8,064,684 B2 * | 11/2011 | Ratti et al. | .................... | 382/154 |

OTHER PUBLICATIONS

Grossman, T., et al. (2004), Multi-finger gestural interaction with 3d volumetric displays. In Proceedings of the 17th annual ACM symposium on User interface software and technology, UIST '04, pp. 61-70, ACM New York, NY, USA 2004.

Hilleges, O., et al. (2009), Interactions in the air: adding further depth to interactive tabletops. In Proceedings of the 22nd annual ACM symposium on User interface software and technology, UIST '09, pp. 139-148, ACM New York, NY, USA 2009.

Wilson, A. (2006), Robust computer vision-based detection of pinching for one and two-handed gesture input. In Proceedings of the 19th annual ACM symposium on User interface software and technology, UIST '06, pp. 255-258, ACM New York, NY, USA 2006.

Zigelbaum, J., et al. (2010), g-stalt: a chirocentric, spatiotemporal, and telekinetic gestural interface. In Proceedings of the fourth international conference on Tangible, embedded, and embodied interaction, TEI '10, pp. 261-264, ACM New York, NY, USA 2010.

(Continued)

*Primary Examiner* — Kenneth B Lee, Jr.
(74) *Attorney, Agent, or Firm* — Stephen R. Otis

(57) ABSTRACT

In exemplary implementations of this invention, an array of linear actuators can be used to form a segmented surface. The surface can resemble a low relief sculpture. A user may control the shape of the surface by direct touch manipulation or by making freehand gestures at a distance from the surface. For example, the freehand gestures may comprise input instructions for selecting, translating, and rotating the shape of an object. A projector may augment the rendered shapes by projecting graphics on the surface.

19 Claims, 12 Drawing Sheets

(56) References Cited

OTHER PUBLICATIONS

Rekimoto, J. (2002), SmartSkin: an infrastructure for freehand manipulation on interactive surfaces. In Proceedings of the SIGCHI Conference on Human Factors in Computing Systems, CHI '02, pp. 113-120, ACM New York, NY, USA 2002.

Rossignac, J., et al. (2003), Finger Sculpting with Digital Clay: 3D Shape Input and Output through a Computer-Controlled Real Surface. In Proceedings of the Shape Modeling International 2003, SMI '03, p. 229, IEEE Computer Society Washington, DC, USA 2003.

Iwata, H., et al., (2001) Project Feelex: adding haptic surface to graphics. In Proceedings of the 28th annual conference on Computer graphics and interactive techniques, SIGGRAPH '01, pp. 469-476, ACM New York, NY, USA 2001.

Author Unknown, (first posted online in 2007 or earlier). Feelex. Accessed online on Nov. 10, 2013 at http://intron.kz.tsukuba.ac.jp/feelex/feelex_e.html.

Leithinger, D., et al. (2010) Relief: a scalable actuated shape display. In Proceedings of the fourth international conference on Tangible, embedded, and embodied interaction, TEI '10, pp. 221-22, ACM New York, NY, USA 2010.

Poupyrev, I., et al. (2004) Lumen: interactive visual and shape display for calm computing. In Proceedings SIGGRAPH '04 ACM SIGGRAPH 2004 Emerging technologies, p. 17, ACM New York, NY, USA 2004.

Francica, J. (2004) Interview with Xenotran Founder, Dr. Derrick Page. Directions Magazine, Nov. 21, 2004. Accessed online on Nov. 11, 2013 at http://www.directionsmag.com/articles/interview-with-xenotran-founder-drderrick-page/123593.

* cited by examiner

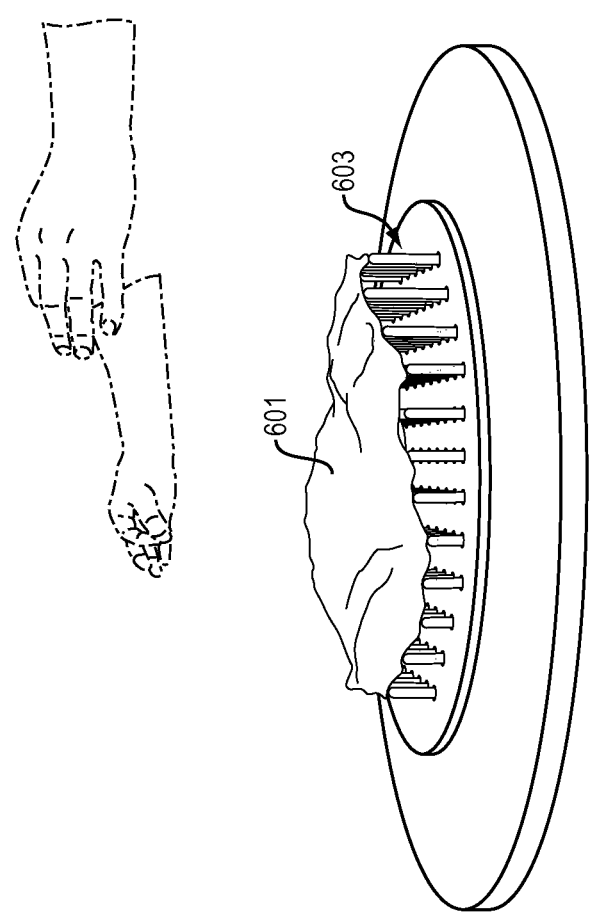

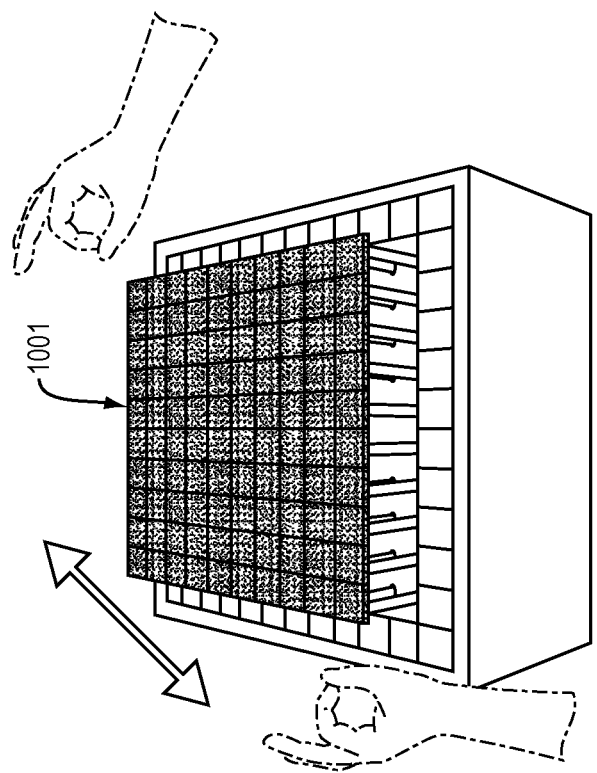
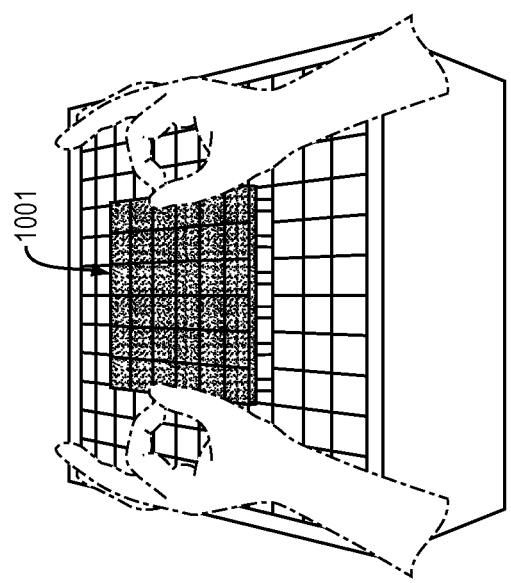
FIG. 10B
FIG. 10A

METHODS AND APPARATUS FOR ACTUATED 3D SURFACE WITH GESTURAL INTERACTIVITY

RELATED APPLICATIONS

This application claims the benefit of U.S. Provisional Application Ser. No. 61/486,579 filed May 16, 2011 the entire disclosure of which is herein incorporated by reference.

FIELD OF THE TECHNOLOGY

The present invention relates generally to actuated 3D surfaces.

SUMMARY

In exemplary implementations of this invention, an array of linear actuators can be used to form a segmented surface. The surface can resemble a low relief sculpture. A user may control the shape of the surface by direct touch manipulation or by making freehand gestures at a distance from the surface. For example, the freehand gestures may comprise input instructions for selecting, translating, and rotating the shape of an object. A projector may augment the rendered shapes by projecting graphics on the surface.

The above description of the present invention is just a summary. It is intended only to give a general introduction to some illustrative implementations of this invention. It does not describe all of the details of this invention. This invention may be implemented in many other ways.

BRIEF DESCRIPTION OF THE DRAWINGS

FIG. 6 shows an example of terrain being depicted by a relief display.

FIGS. 10A and 10B show a gesture for scaling of the selected area.

The above Figures illustrate some illustrative implementations of this invention, or provide information that relates to those implementations. However, this invention may be implemented in many other ways. The above Figures do not show all of the details of this invention.

DETAILED DESCRIPTION

Figure 1:
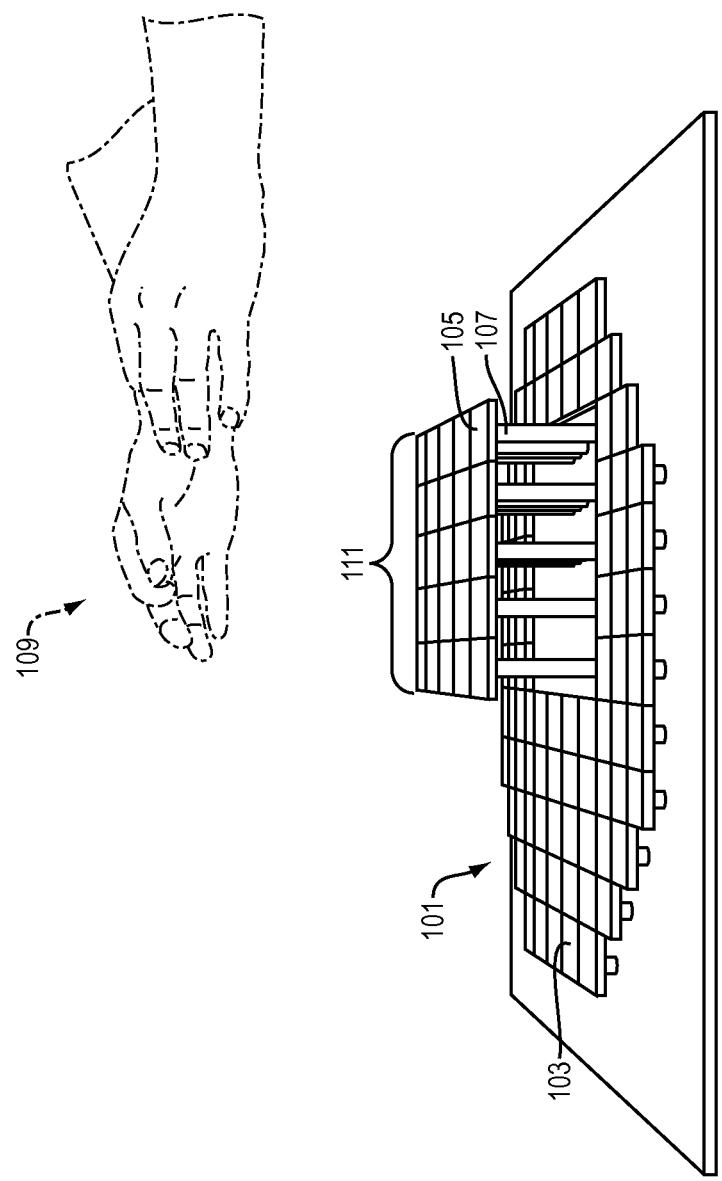
FIG. 1 shows an actual relief display being controlled by a user hand gesture.

In exemplary implementations, this invention comprises an actuated, segmented, physical surface. As shown in FIG. 1, a physical surface 101 comprises multiple segments (e.g., 103). Each segment of the surface comprises a wide tip 105 of a rod (e.g. 107). The rods are actuated by DC electric motors (not shown). A user may control the shape of the surface by making freehand gestures above the surface or by directly manipulating the surface. For example, a gesture may comprise a pinching gesture 109 by each hand. In the example shown in FIG. 1, a user has, by making freehand gestures, provided human input that comprises an instruction to translate (along their longitudinal axes) a subset of the rods. The result, in that example, is that a subset of the segments 111 is raised above the remainder of the segments.

In these exemplary embodiments, a fixed two-dimensional array of linear actuators creates shape displays. The resulting surface can be similar to a low relief sculpture, and thus can be called a "relief display". An array of actuated rods forms a surface. This layout of actuators allows simple mechanical design, since the actuators can be hidden under the surface. The generated shape may be augmented with visuals: either through LED's embedded in the rods or top-down projection on the surface.

In exemplary implementations of this invention, the following interactions can be supported: (a) transformation of scene view; (b) selection of model vertices; and (c) transformation of selected vertices.

Figure 2:
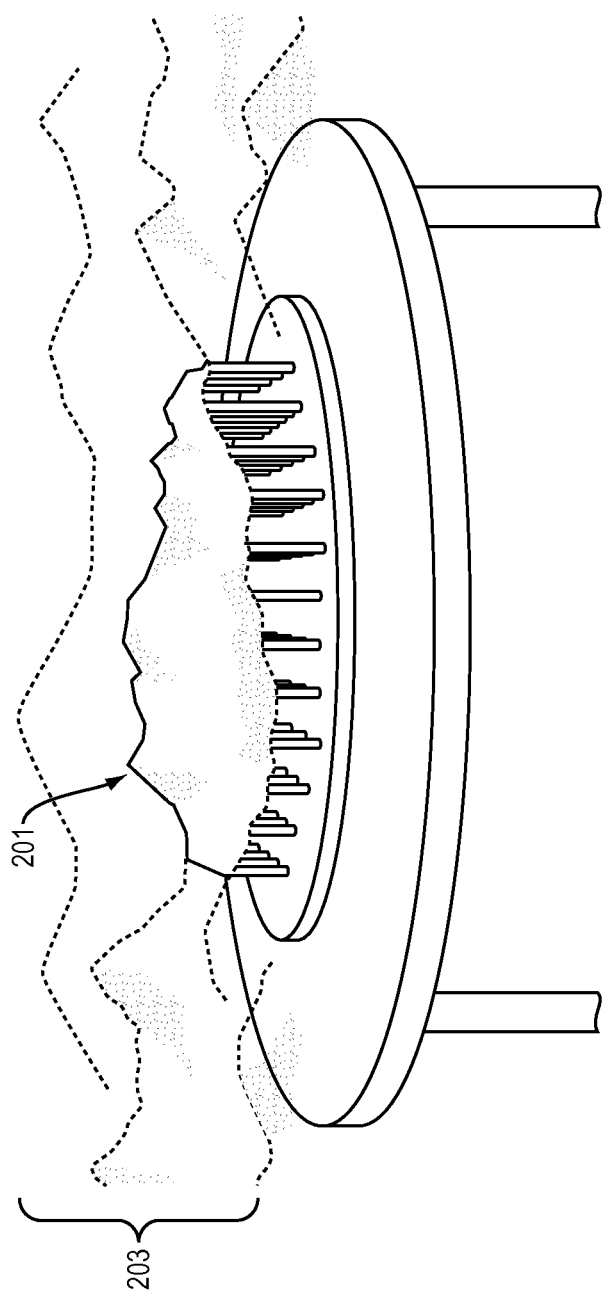
FIG. 2 shows a relief display that outputs a subset of a total geometry.

As shown in FIG. 2, the rods may be covered with a malleable layer or sheet 201. The sheet 201 may define a shape that is part of a larger geometry 203 (for example, a portion of a larger 3D terrain map).

In exemplary implementations, a user is not limited to directly manipulating the surface. The user can also control the actuation of the surface by making freehand gestures at a distance from the surface. The ability to make freehand gestures is highly advantageous. Among other things, freehand gestures overcome the following three limitations of input through touch.

First, due to limited resolution, the rods can only generate an approximation of a desired 3D shape. Thus global operations such as zoom, translation and rotation are preferable, in order to view details of the desired 3D shape. Such global operations may be controlled more easily with freehand gestures than by directly touching the rods.

Figure 3:
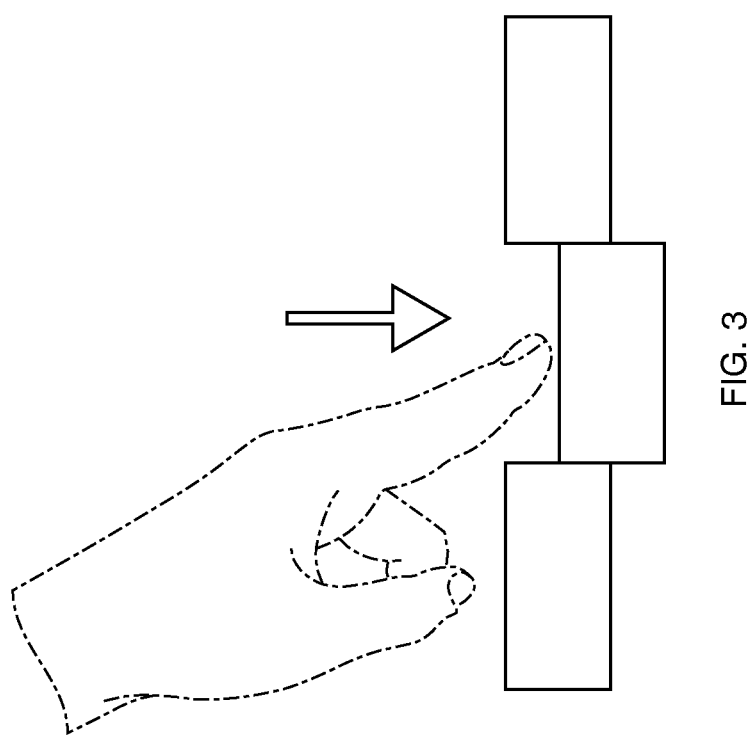
FIG. 3 shows a user pushing down on a surface.
Figure 4:
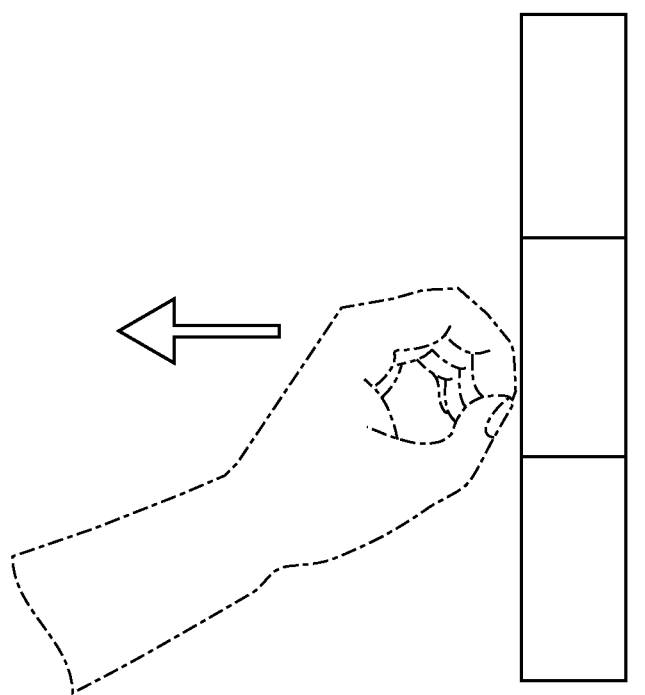
FIG. 4 shows a user trying to pull up on a surface.

Second, pushing down part of a surface can easily be accomplished with direct touch, as shown in FIG. 3. However, it can be difficult for a user to pull up part of the surface by direct touch, as shown in FIG. 4.

Figure 5:
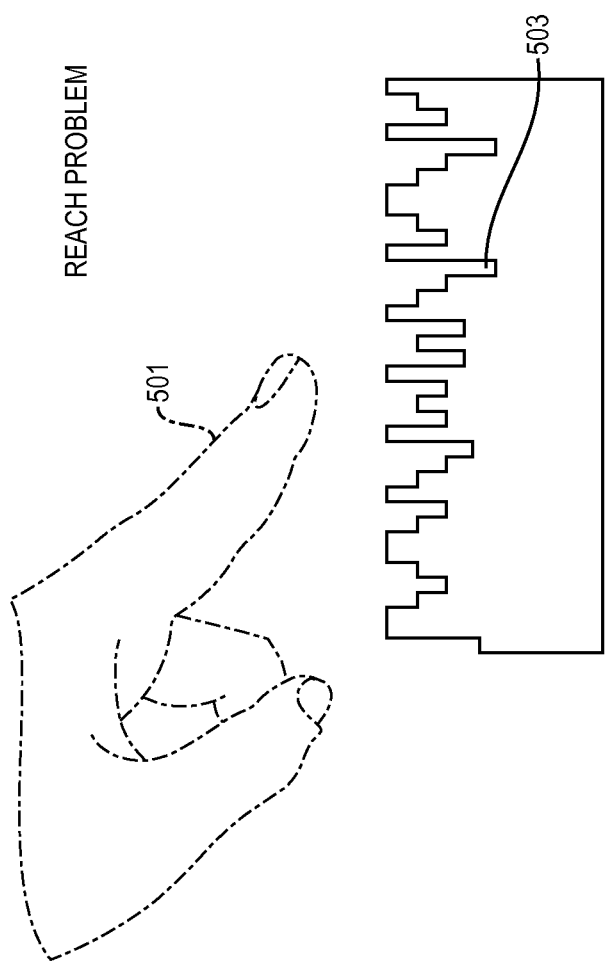
FIG. 5 illustrates the "reach problem".

Third, direct touch interaction suffers from the "reach problem". The resolution of the relief interface may hinder a user to reach certain area due to surface topology. For example, as shown in FIG. 5, a user's finger 501 may be unable to reach a small segment of the surface (e.g., 503) because the finger 501 is thicker than the segment 503 and the segment 503 is surrounded by higher segments.

In some implementations of this invention, the actuators that move the rods are not packed densely enough to create a resolution capable of outputting a perceived continuous shape. However, perceived resolution can be increased by stretching a malleable sheet 601 over the pin array 605, as shown in FIG. 6. This can produce the illusion of continuous shape.

In exemplary implementations, gestural input provides an additional interaction modality. Gestures can be utilized to perform functional commands over the entire surface without altering the locus of interaction. By expressing gestures directly above the surface, a user can seamlessly switch between selection, manipulation, and translation of objects on a relief display. When coupled with direct touch, a user is able to maximize functionality without creating input ambiguity.

Figure 7B:
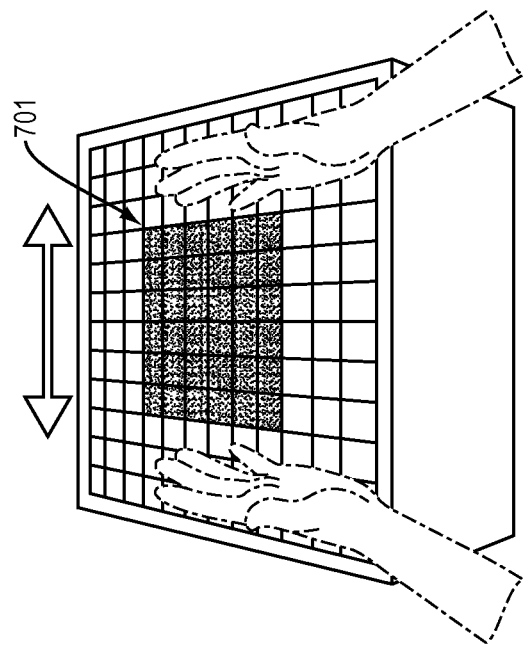
FIGS. 7A and 7B show a gesture for selection of an area of a surface.
Figure 7A:
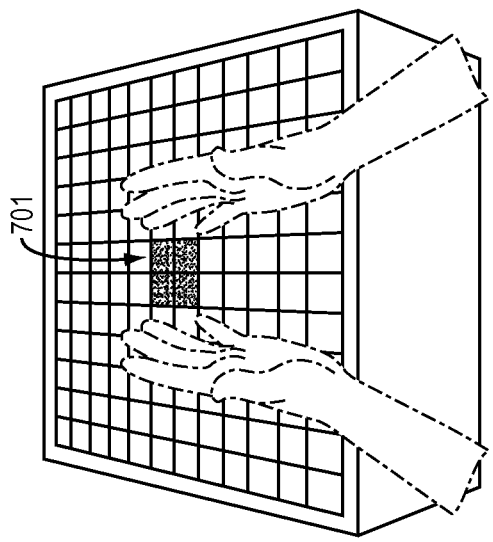

In exemplary implementations, the gestures include: selection of an area, translation of the selection, rotation of the selection, and scaling of the selection. Further description of these techniques follows:

In order to select a subset of the surface the user forms two parallel vertical planes with the user's hands. In the examples shown in FIGS. 7A and 7B, a user has selected a small area and a large area, respectively. A projector (not shown) indicates the selected area 701 with a projected selection box. A two-finger pinch on either hand locks the selection dimensions, enabling manipulation through a number of gestures.

Figure 8A:
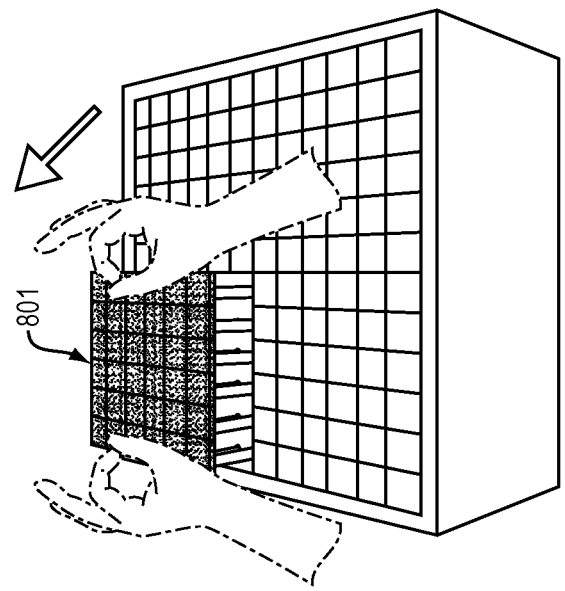
FIGS. 8A and 8B show a gesture for translation of the selected area.
Figure 8B:
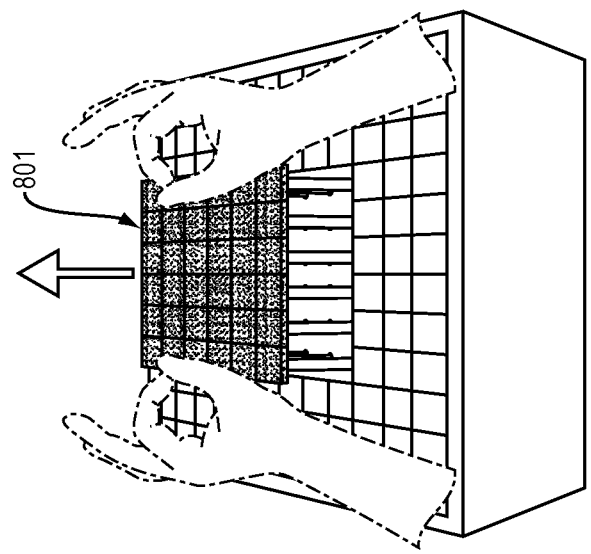

By adjusting hand position along the X, Y, or Z-axis, the user can translate a selected area of the surface. For example, a user can cause a selected area 801 of the surface to move up (FIG. 8A) or to move backwards and to the left (FIG. 8B). After reaching the desired height and position the user can release the pinch gesture, saving surface state, and resetting the interaction state back to selection mode. The translation can be along up to three axes (X, Y and Z-axes) simultaneously.

Figure 9B:
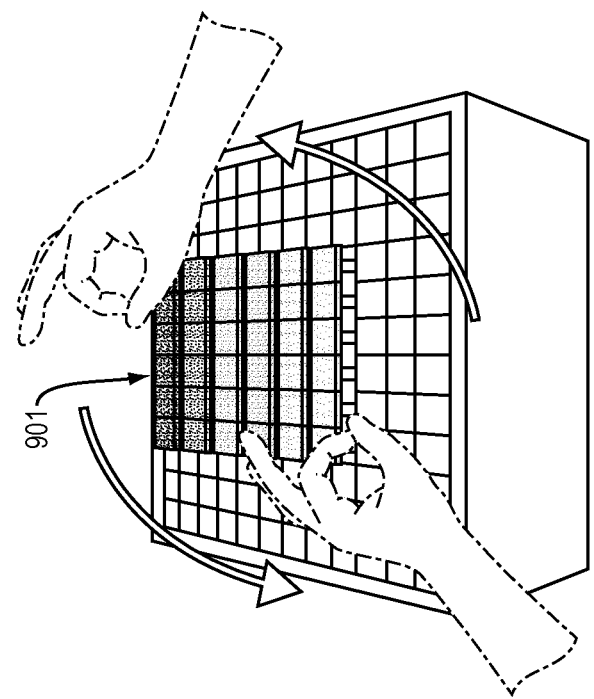
FIGS. 9A and 9B show a gesture for rotation of the selected area.
Figure 9A:
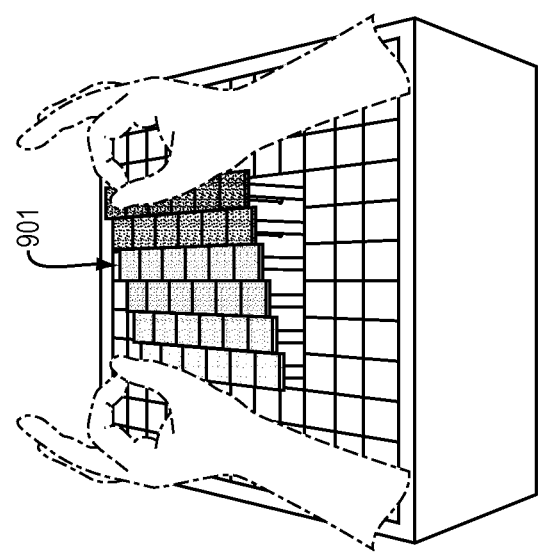

By rotating the locked hands about the X, Y or Z-axis, the selection rotates accordingly. For example, a user can cause a selected area 901 of the surface to rotate from an initial position (FIG. 9A) to a different position (FIG. 9B).

By changing the distance between the locked hands, the selection scales proportionally. For example, a user can cause a selected area 1001 of the surface to scale from a smaller size (FIG. 10A) to a larger size (FIG. 10B).

In exemplary implementations, direct haptic manipulation is a component of user interaction. By allowing direct manipulation of pin height, users are afforded such haptic feedback. The modality change between direct manipulation and gestural input can be complementary and seamless.

Figure 11A:
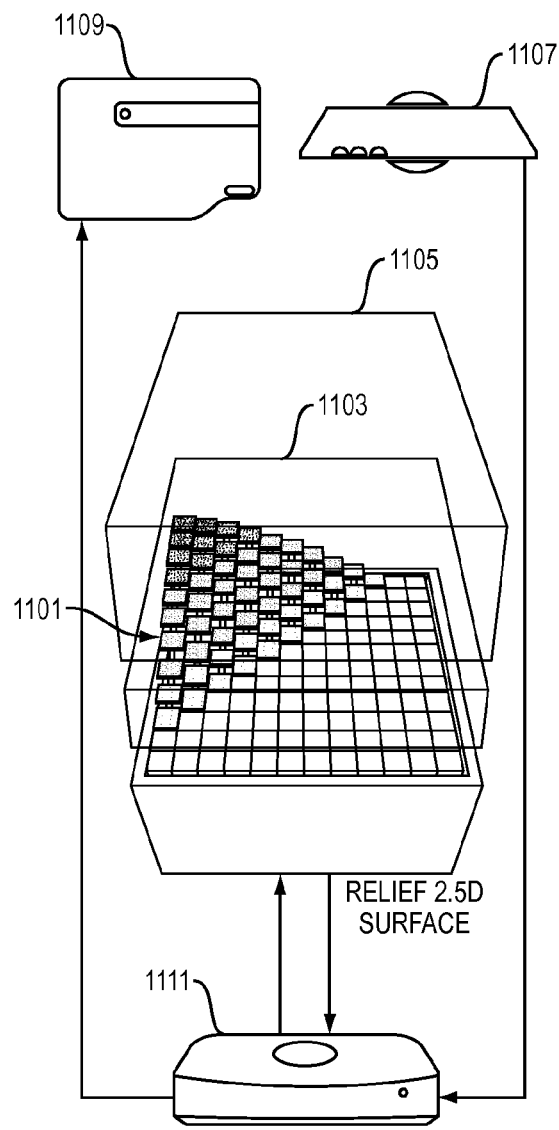
FIG. 11A shows a prototype of this invention.

FIG. 11A shows a prototype of this invention. In this prototype, a tabletop display comprises an array of individually addressable aluminum pins 1101, built into a tabletop. The height of the pins can be actuated and read back simultaneously, thus allowing the user to utilize them as both input and output. A depth camera 1107 is positioned above the tabletop display. A computer 1111 uses the depth information to detect gestures from the user.

The pins are spaced 5 cm inches apart from each other. The pins can protrude up to 13 cm above the table surface. Each pin has a resolution of 7 bits, thus the pins can be controlled in 1 mm increments.

In this prototype, every pin is actuated by an individually controlled electric slide potentiometer (Alps® RSA0N11M). These potentiometers have the following advantages: fast actuation, robust, relatively inexpensive, and precise sensing.

Each potentiometer is equipped with a DC motor, which is controlled by an Arduino® Duemilanove board with an attached Ladyada motor shield. Each of these boards can drive 4 motors, 32 boards are used in our current setup. The individual boards communicate through an I2C bus; up to 10 boards are connected to the bus as slave units and receive commands from a master unit, which receives input from an attached computer through a serial over USB connection. The boards not only receive positions, but also report back each current actuator state.

In this prototype, each pin is connected to a square block. The square block is a wide tip at the top of the pin. These square blocks create a surface for top-down projection and for affording the user direct manipulation by pulling or pushing.

In order to provide the user visual feedback a projector 1109 is mounted 150 cm above the table. A projected graphical user interface guides the user through the interaction and colors the individual pin platforms corresponding to their actuated height.

Depth reading is achieved through a Microsoft® Kinect® depth camera 1107. The camera 1107 is located inline with the projector 1109 centered to the table in order to minimize the parallax error arising from asymmetrical placement. The camera is mounted at a distance of 135 cm from the tabletop surface as a compromise between maximum covered area and sufficient precision to accurately detect gestures.

Both the depth camera 1107 and the actuated surface control system are connected to a Unix® based operating system, where host software processes the required computation.

Software on the control machine 1111 is written in OpenFrameworks®. Rendering on the actuated surface is achieved by processing the depth buffer of the 3D mesh and sending the depth values to the hardware actuators. Direct touch input is detected by computing the difference of the last actuated and currently reported height.

Freehand gesture input is sensed with a depth camera 1107. After acquiring the depth image of the camera, the user's contour is computed from the depth values. For gesture recognition a state-machine is implemented that stores the current gesture state and reacts to changes in hand posture accordingly. After extracting curvature of the blobs corresponding to the hands of the user, an algorithm finds fingers and determines the current height of the hands. From the computer vision data, the algorithm processes curvature data to distill hand gestures for height manipulation. The algorithm is implemented through OpenCV calls implemented inside OpenFrameworks®.

In this prototype, a user can interact by freehand gesture in a field of gestural input 1105 or in a field of direct manipulation 1103. The former field is a volume that does not include the surface; the latter field is a volume that includes all points in which the surface can be positioned.

Figure 11B:
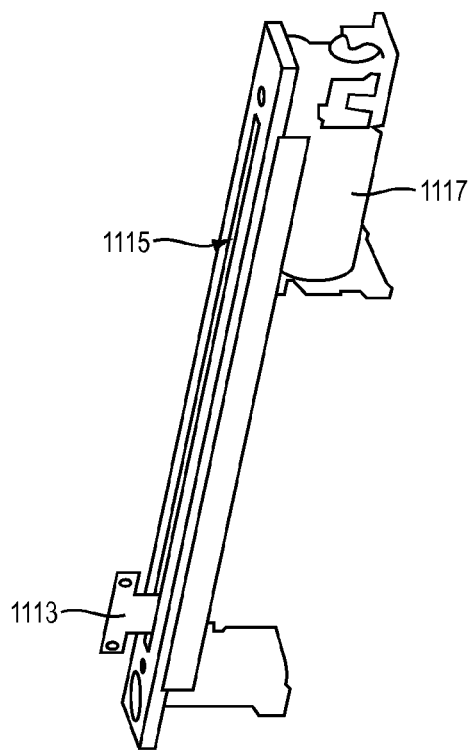
FIG. 11B shows an actuator element in this prototype.

FIG. 11B shows an actuator element in this prototype. A DC motor 1117 moves a belt 1115 that in turn moves a slider 1113.

Figure 12:
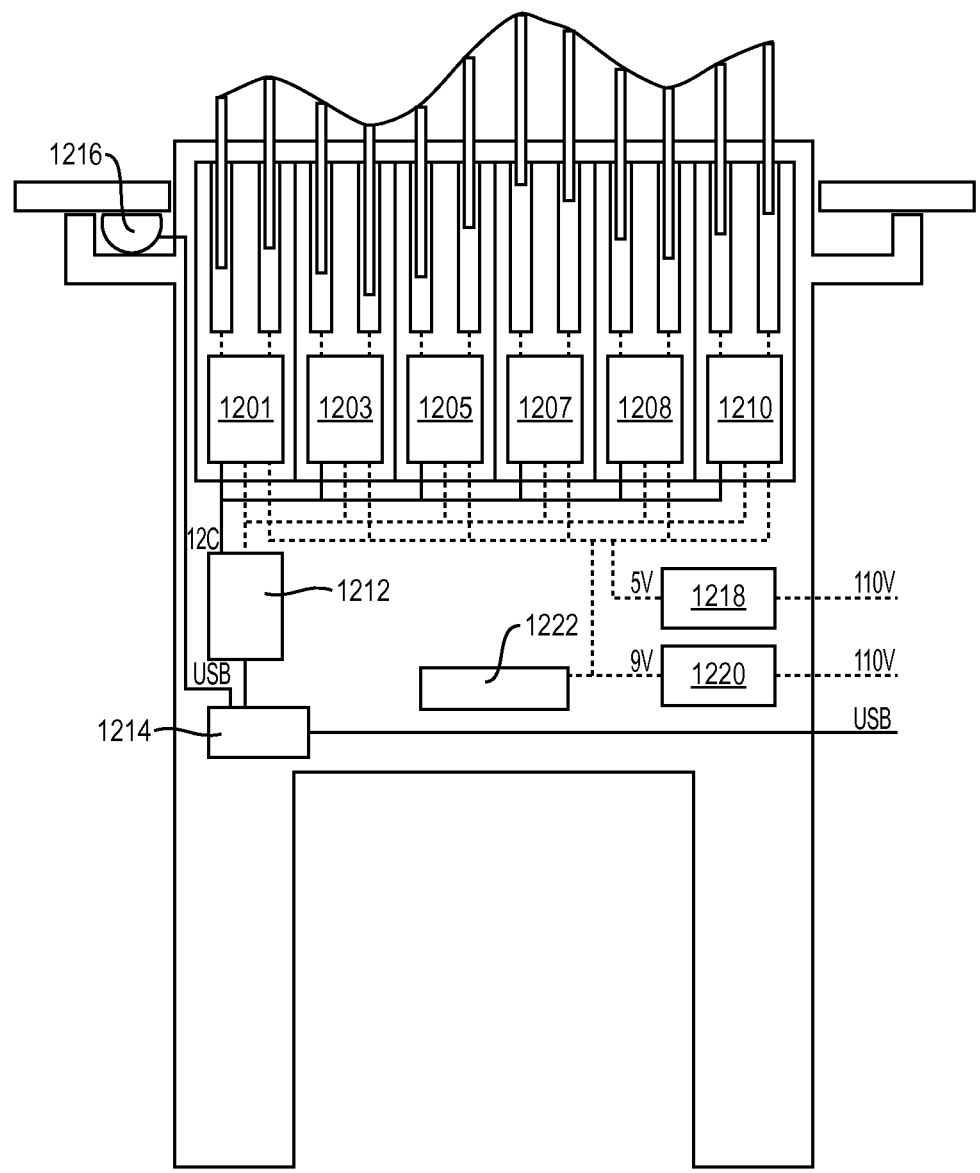
FIG. 12 shows a schematic of an actuator apparatus.

FIG. 12 shows a schematic of an actuator apparatus for a prototype. The apparatus comprises control units with motorized slide potentiometers 1201, 1203, 1205, 1207, 1208, 1210, master control units 1212, USB hub 1214, optical ring input sensing 1216, power supplies 1218, 1220, and cooling fans 1222.

DEFINITIONS AND CLARIFICATIONS

Here are a few definitions and clarifications. As used herein:

The terms "a" and "an", when modifying a noun, do not imply that only one of the noun exists.

The term "include" shall be construed broadly, as if followed by "without limitation".

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored.

Two values are "substantially" equal if they differ by less than 10%. Two values differ "substantially" if they differ by 10% or more. For purposes of the definition of "substantially": two values differ by a certain percent, if $[(x-y)/x] \times 100$ equals that certain percent, where x is the larger of the two values and y is the smaller of the two values.

Variations

This invention may be implemented in many different ways. Here are some non-limiting examples:

Additional gestures can allow users to quickly duplicate shapes. The duplicated shapes can be both digital models and physical objects captured by the depth-sensing camera.

A timeline of all surface manipulation captured during a session can be used for time reversal, state saving, and undo type functions.

Techniques commonly found in drafting and 3D modeling tools, such as spline lofting and Boolean operations, may be employed.

High fidelity gesture recognition may be coupled with higher resolution.

Other, additional input modalities may be employed. For example, a standard trackball mouse may be used for global surface navigation. In this example, a series of interactions map to the features of the trackball. Rolling the ball in any direction pans the surface accordingly. Similarly, pressing either mouse button activates standard zoom in and out commands across the entire surface.

Input features of pan and zoom can be implemented directly onto the relief display itself. For example, the edge pins of the interface can activate panning. By pushing the pins, the user can pan the scene according to location of the push along the edge. Zooming in can be achieved by pushing on center pins, while zooming out by pushing on opposing edge pins.

This invention may be implemented as a method of moving segments of a physical surface, which method comprises, in combination: (a) using one or more sensors to gather sensor data indicative of human input, which human input comprises gestures made while not in contact with the surface, (b) using one or more processors to recognize (based at least in part on the sensor data) the human input, and to generate (based at least in part on the human input) control signals for controlling motion of the segments, and (c) using one or more actuators to selectively move (in accordance with the control signals) at least some of the segments, wherein each of the respective segments is adapted to be moved independently of the remainder of the segments, and the surface is adapted to be discontinuous, at least between some of the segments in at least some spatial arrangements of the segments. Furthermore: (1) the human input may further comprise direct physical manipulation of the surface or of a malleable component that is adjacent to the surface; (2) at least some of the segments may comprise elongated structures, each of which elongated structures respectively may have a longitudinal axis, and the one or more actuators may move at least some of the elongated structures (relative to the one or more actuators) along the respective longitudinal axes, (3) each of the elongated structures may have two longitudinal ends and a central region that is between the two longitudinal ends, at least one of the longitudinal ends may comprise a tip that is wider (along a direction normal to the longitudinal axis) than the central region, and the surface may comprise at least some of the tips; (4) the surface may be covered by a flexible sheet; (5) the method may further comprise projecting images onto the surface or onto the flexible sheet; (6) the one or more actuators may comprise electric motors, (7) the human input may comprise an instruction to select a subset of the segments, (8) the human input may comprise an instruction for the one or more actuators to translate each of a subset of the elongated structures along their respective longitudinal axes; (9) a portion of the surface may define a shape, and the human input may comprise an instruction to translate or rotate the shape to a different portion of the surface; (10) a portion of the surface may define a particular shape, and the human input may comprise an instruction to alter the surface to increase or decrease the size of the particular shape; (11) the gestures may be made by one or more gloveless hands; and (12) the gestures may be made by at least one hand, with no visual marker or visual tag affixed to or worn on the at least one hand.

This invention may be implemented as a method of moving segments of a physical surface, which method comprises, in combination: (a) using one or more sensors to gather sensor data indicative of human input, which human input comprises gestures that occur more than 3 centimeters from the surface, (b) using one or more processors to recognize (based at least in part on the sensor data) the human input, and to generate (based at least in part on the human input) control signals for controlling motion of the segments, and (c) using one or more actuators to selectively move (in accordance with the control signals) at least some of the segments, wherein each of the respective segments is adapted to be moved independently of the remainder of the segments.

This invention may be implemented as apparatus comprising in combination: (a) a physical surface comprising multiple segments, (b) one or more sensors for gathering sensor data indicative of human input, which human input comprises gestures that occur more than 3 centimeters from the surface, (c) one or more processors for recognizing (based at least in part on the sensor data) the human input, and generating (based at least in part on the human input) control signals for controlling motion of the segments, and (d) one or more actuators for selectively moving (in accordance with the control signals) at least some of the segments, wherein each of the respective segments is adapted to be moved independently of the remainder of the segments, and the surface is adapted to be discontinuous, at least between some of the segments in at least some configurations. Furthermore: (1) the human input may further comprise direct physical manipulation of at least some of the segments; (2) at least some of the segments may comprise elongated structures, each of which elongated structures respectively has a longitudinal axis, and the one or more actuators may be adapted to move at least some of the elongated structures along the respective longitudinal axes; (3) the apparatus may further comprise a flexible sheet for covering the surface; (4) the human input may comprise an instruction for the one or more actuators to translate each of a subset of the elongated structures along their respective longitudinal axes; and (5) a portion of the surface may define a shape, and the human input may comprise an instruction to translate or rotate the shape to a different portion of the surface.

CONCLUSION

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. A method of moving segments of a physical surface, which method comprises, in combination:
    (a) one or more sensors gathering sensor data indicative of human input, which human input comprises gestures made while not in contact with the surface;
    (b) one or more processors
        (i) recognizing, based at least in part on the sensor data, the human input, and (ii) generating, based at least in part on the human input, control signals for controlling motion of the segments; and (c) one or more actuators selectively moving, in accordance with the control signals, at least some of the segments, wherein
  (A) each of the respective segments is adapted to be moved independently of the remainder of the segments,
  (B) the surface is adapted to be discontinuous, at least between some of the segments in at least some spatial arrangements of the segments, and
  (C) the human input further comprises direct physical manipulation of the surface or of a malleable component that is adjacent to the surface.

2. The method of claim 1, wherein
at least some of the segments comprise elongated structures, each of which elongated structures respectively has a longitudinal axis, and
the one or more actuators move at least some of the elongated structures (relative to the one or more actuators) along the respective longitudinal axes.

3. The method of claim 2, wherein
each of the elongated structures has two longitudinal ends and a central region that is between the two longitudinal ends,
at least one of the longitudinal ends comprises a tip that is wider (along a direction normal to the longitudinal axis) than the central region, and
the surface comprises at least some of the tips.

4. The method of claim 1, wherein the surface is covered by a flexible sheet.

5. The method of claim 4, wherein the method further comprises projecting images onto the surface or onto the flexible sheet.

6. The method of claim 1, wherein the one or more actuators comprise electric motors.

7. The method of claim 1, wherein the human input comprises an instruction to select a subset of the segments.

8. The method of claim 2, wherein the human input comprises an instruction for the one or more actuators to translate each of a subset of the elongated structures along their respective longitudinal axes.

9. The method of claim 1, wherein a portion of the surface defines a shape, and the human input comprises an instruction to translate or rotate the shape to a different portion of the surface.

10. The method of claim 1, wherein a portion of the surface defines a particular shape, and wherein the human input comprises an instruction to alter the surface to increase or decrease the size of the particular shape.

11. The method of claim 1, wherein the gestures are made by one or more gloveless hands.

12. The method of claim 1, wherein the gestures are made by at least one hand, and no visual marker or visual tag is affixed to or worn on the at least one hand.

13. A method of moving segments of a physical surface, which method comprises, in combination:
  (a) one or more sensors gathering sensor data indicative of human input, which human input comprises gestures that occur more than 3 centimeters from the surface;
  (b) one or more processors
    (i) recognizing, based at least in part on the sensor data, the human input, and
    (ii) generating, based at least in part on the human input, control signals for controlling motion of the segments; and
  (c) one or more actuators selectively moving, in accordance with the control signals, at least some of the segments, wherein
    (A) each of the respective segments is adapted to be moved independently of the remainder of the segments, and
    (B) the human input further comprises direct physical manipulation of the surface or of a malleable component that is adjacent to the surface.

14. Apparatus comprising in combination:
  (a) a physical surface comprising multiple segments;
  (b) one or more sensors for gathering sensor data indicative of human input, which human input comprises gestures that occur more than 3 centimeters from the surface;
  (c) one or more processors for
    (i) recognizing, based at least in part on the sensor data, the human input, and
    generating, based at least in part on the human input, control signals for controlling motion of the segments; and
  (d) one or more actuators for selectively moving, in accordance with the control signals, at least some of the segments;
wherein
  (A) each of the respective segments is adapted to be moved independently of the remainder of the segments,
  (B) the surface is adapted to be discontinuous, at least between some of the segments in at least some configurations, and
  (C) the human input further comprises direct physical manipulation of the surface or of a malleable component that is adjacent to the surface.

15. The apparatus of claim 14, wherein the human input further comprises direct physical manipulation of at least some of the segments.

16. The apparatus of claim 14, wherein
at least some of the segments comprise elongated structures, each of which elongated structures respectively has a longitudinal axis, and
the one or more actuators are adapted to move at least some of the elongated structures along the respective longitudinal axes.

17. The apparatus of claim 14, further comprising a flexible sheet for covering the surface.

18. The apparatus of claim 14, wherein the human input comprises an instruction for the one or more actuators to translate each of a subset of the elongated structures along their respective longitudinal axes.

19. The apparatus of claim 14, wherein a portion of the surface defines a shape, and the human input comprises an instruction to translate or rotate the shape to a different portion of the surface.

* * * * *